Figure 1:
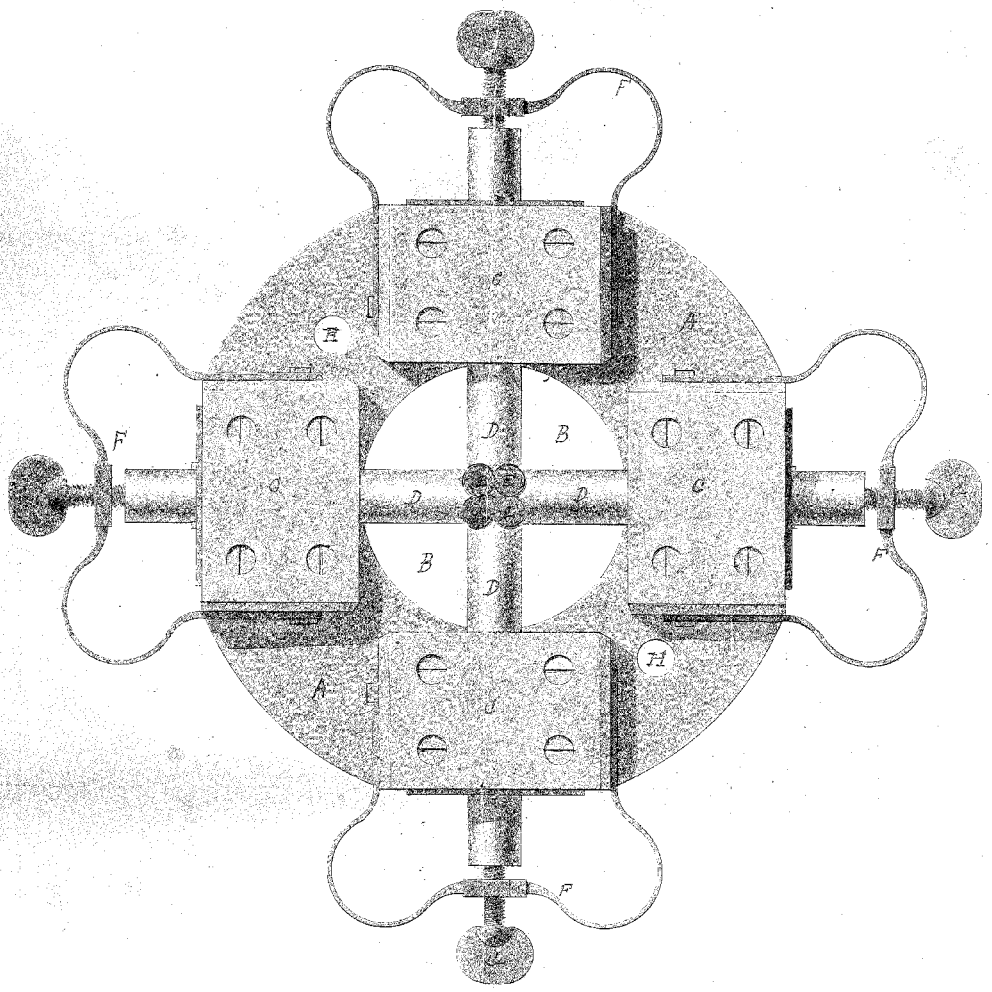

(12) United States Patent
Treadwell

(10) Patent No.: X7997
(45) Date of Patent: Feb. 5, 1834

(54) IMPROVEMENT IN THE ART OF ROPE MAKING CALLED AN IRON TAIL

(76) Inventor: Daniel Treadwell

HUG 1347.505 PF
1830's

The United States of America

TO ALL TO WHOM THESE LETTERS PATENT SHALL COME:

Whereas [illegible] Treadwell, a citizen of the United States, hath alleged that he has invented a new and useful improvement in the art of Rope Making called an Iron Top, which improvement he states has not been known or used before his application; hath made oath that he does verily believe that he is the true inventor or discoverer of the said improvement; hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose. These are therefore to grant, according to law, to the said [illegible] Treadwell his heirs, administrators or assigns, for the term of fourteen years, from the fifth day of February one thousand eight hundred and thirty four the full and exclusive right and liberty of making, constructing, using and vending to others to be used, the said improvement, a description whereof is given in the words of the said [illegible] Treadwell himself, in the schedule hereto annexed, and is made a part of these presents.

In Testimony whereof, I have caused these Letters to be made Patent and the Seal of the United States to be hereunto affixed.

GIVEN under my hand, at the City of Washington, this fifth day of February in the year of our Lord one thousand eight hundred and thirty four and of the independence of the United States of America the fifty eighth Andrew Jackson

BY THE PRESIDENT,

Louis McLane Secretary of State.

City of Washington, TO WIT:

I DO HEREBY CERTIFY, That the foregoing Letters Patent were delivered to me on the fifth day of February in the year of our Lord one thousand eight hundred and thirty four to be examined; that I have examined the same, and find them conformable to law; and I do hereby return the same to the Secretary of State, within fifteen days from the date aforesaid, to wit: on this fifth day of February in the year aforesaid.

[illegible]

Attorney General of the United States.

The Schedule referred to in these Letters Patent, and making part of the same containing a description in the words of the said Daniel Treadwell himself of his Improvement in the art of Rope making called an "Iron Tail" ——

Know all men that I Daniel Treadwell of Boston in the Commonwealth of Massachusetts Engineer have invented a new & useful machine or instrument in the manufacture of cordage & lines which machine or instrument is called an "iron tail". — This iron tail is a substitute for the common rope tails so called used in rope making the use & object of which is well known to all workmen being to hold back the "top" so that the proper quantity of turn may be given in the lay. —— Complete drawings of the iron tail for which a patent is [illegible] are hereto [illegible] and here declared to make a part of this specification.

Figure 2:
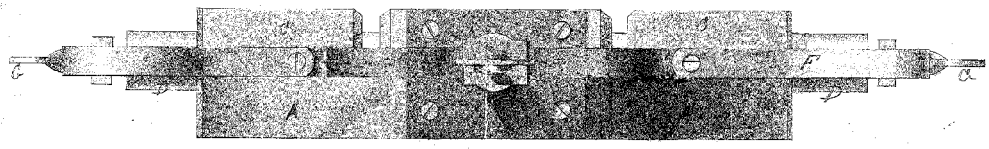
Figure 3:
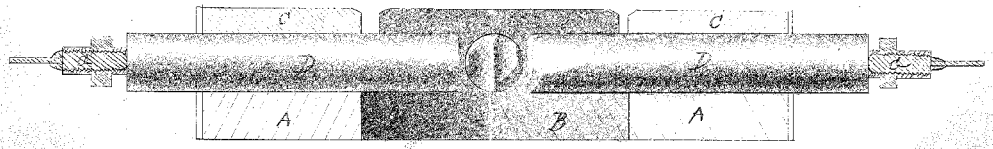

Fig 1 represents a view in front. Fig 2 a plan. Fig 3 a section

The same letters refer to the same part in all the figures —

The drawings are for a tail to make a four stranded rope —

A.A. is a disk of wood or iron having thro it the hole or opening B.B. —— Four blocks CCCC are secured upon the side of the disk AA. —— Four cylindrical holes pass from the center or opening of the disk AA to the circumference one half of each hole being formed in the substance of the disk AA & the corresponding half in the blocks C.C. —— Thro these holes are passed four iron or other solid cylinders DDDD called rubbers. —— The end of each of these rubbers nearest the center of the disk is fashioned into a shape representing portions of [illegible] hollow cylinders as seen at Fig 3 where EEEE represent a section of four strands of a rope untwisted & laying side by side the whole being covered by the ends of the rubbers DDDD. ——

FFFF are springs fixed to the blocks CCCC & having screws GGGG passing thro their middles for the purpose of adjusting the pressure upon the rope. —— HH are two holes thro which are passed cords for the purpose of confining the tail at a proper distance from the top. —— The method of using the iron tail is as follows — Having hardened the strands of which the rope is to be formed the ends at which they lay is to be commenced are to be passed thro the disk between the ends of the rubbers. —— The top being then put in its place a sufficient degree of after turn is then to be put into the rope below the top. —— The tail is then to be secured at a small distance from the top by two cords or lines passing from the holes HH [illegible]

[illegible] ated. The rubbers are then to be adjusted upon the rope by the screws GGGG.
as each rubber is pressed down upon it and will adjust
itself to the spiral form assumed by the strands the ridge in the
middle of each rubber falling into the [illegible] of the rope —
If the proper motions be then given for laying the
rope it will be found that as the top advances the tail will
follow it. care being taken that it does not turn round with
the rope laying the strands smooth & even upon each other with-
out [illegible] the tow.

In the foregoing specification I have described the
tail as now constructed & used by me, various modifications
may be made in the different parts of this machine & construc-
ment... But I declare the character of this invention to be com-
prised in the construction & use of rubbers formed of some solid
body by which they are capable of preserving their own figure &
constraining the rope over which they pass to assume the figure
defined by them.

In testimony that the above is a true specification
of my said invention I have hereunto set my hand at Boston
aforesaid this twenty third day of November Eighteen Hundred
& thirty three Witnesses
A. A. Dennie
H. M. Willis Daniel Treadwell Drawings of an Iron tail used in laying ropes